Sept. 17, 1957 J. MARTIN 2,806,664
RELEASABLE LOCKING MEANS FOR EJECTION SEATS FOR AIRCRAFT
Filed Sept. 1, 1954 2 Sheets-Sheet 1
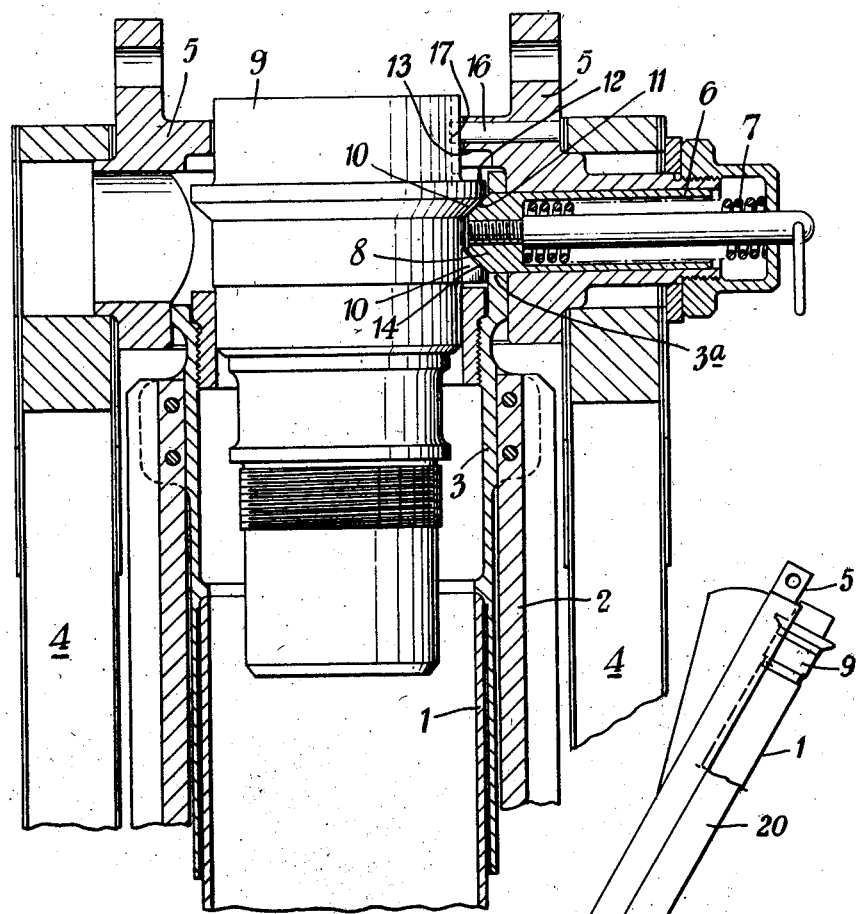
INVENTOR
JAMES MARTIN
per Worth Wade
Attorney.

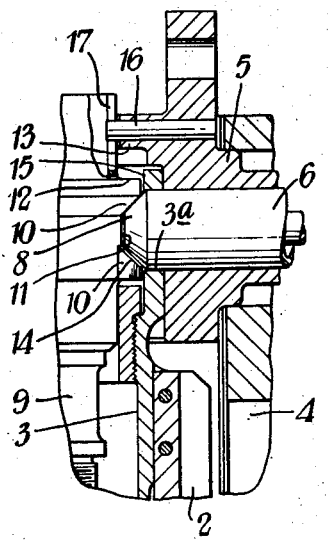
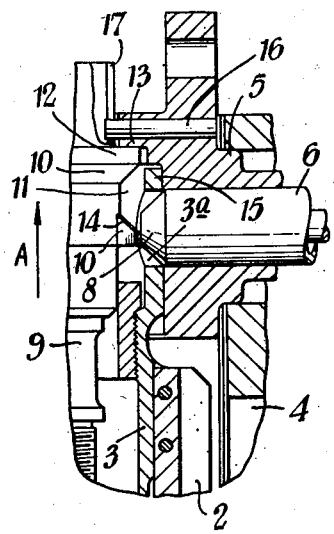
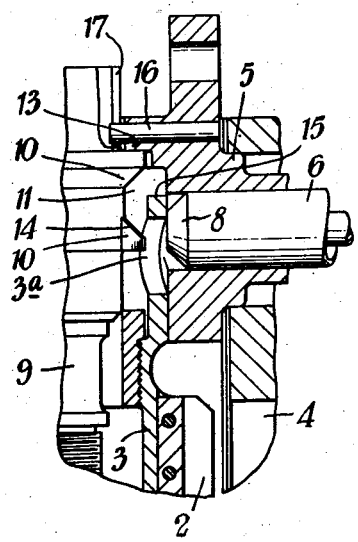

United States Patent Office 2,806,664
Patented Sept. 17, 1957

2,806,664

RELEASABLE LOCKING MEANS FOR EJECTION SEATS FOR AIRCRAFT

James Martin, Denham, near Uxbridge, England

Application September 1, 1954, Serial No. 453,513

1 Claim. (Cl. 244—122)

The invention relates to improvements in and relating to ejection seats for aircraft.

The invention is applied to ejection seats of the type which is adapted to be launched from an aeroplane or other aircraft with the occupant seated therein and mechanism is provided by which the seat is launched from the aircraft by means of an ejection unit actuated by an applied force, for example, by pressure generated by one or more explosive cartridges.

One form of ejection seat to which the invention is particularly adapted comprises a main frame on which the seat is mounted, an ejection gun operating to eject the seat and its frame along guide means fixed in the aircraft, a drogue or drogues, harness, harness release mechanism, and means operable as the seat is ejected from the aircraft to carry out automatically and in correct sequence and timing the operations necessary to allow a pilot to descend on a main parachute. There is provided a blind or screen which is adapted to be drawn into position over the face of the pilot before, and to remain in position during, the launching of the seat and its occupant from the aircraft. Means are provided interconnecting the blind or screen with the firing mechanism of the injection gun so that the act of drawing the blind or screen into position will actuate or release the firing mechanism of the ejection gun.

Ejection seats of the above kind form the subject of my prior Patents Nos. 2,467,763, 2,527,020, 2,569,638, 2,638,294 and 2,708,033.

According to the present invention there is provided means for normally holding or locking an ejection seat in an aircraft and for releasing the seat therefrom when an ejection gun is fired, comprising a spring loaded locking plunger in the seat structure which is normally in engagement with a movable part of the gun and also a fixed part of the gun whereby the seat is locked against movement, the plunger and parts being so inter-related that when the gun is fired and the movable part commences to move relative to the fixed part, the plunger is depressed by and disengaged from the movable part, and the latter engages a part of the seat structure, the movable part and the seat structure then commencing to move together whereupon the plunger is further depressed by the fixed part and disengaged therefrom so that the seat structure is then entirely free to move out of the cockpit of the aircraft.

By the invention an efficient arrangement for normally locking the seat structure is secured, while at the desired time the mechanism is quickly responsive to release the lock so that the seat structure can be ejected from the aircraft.

The accompanying drawings illustrate an example of carrying the invention into effect.

In the drawings:

Fig. 1 is a side elevation partly in section of the upper parts of the ejection gun and seat structure with the locking device incorporated therewith, and Figs. 2, 3 and 4 are diagrammatic views showing the sequence of movements of the locking device and cooperating sleeve-like parts whereby the seat structure is freed on the firing of the ejection gun. Fig. 5 is a fragmentary view in side elevation of the combined seat, gun and aircraft frame.

The constructional example according to the drawings has an ejection gun in which the cylinder or gun barrel 1 has guide rails 2 incorporated therewith, the barrel being fixed to a part 20 of the aircraft structure.

Rollers or runners attached to the seat frame 19 work in channels in the guide rails.

The combined gun guide rail forms the subject of my pending application for patent, Serial No. 453,514, filed September 1, 1954, and no claim is made for this feature per se.

At the upper end of the combined gun guide rails 2 is a cylindrical or sleeve portion 3 having a hole 3a.

The seat structure comprises side beams 4 and a top beam 5. Within the top beam 5 is a locking plunger 6 which is loaded by a spring 7. The plunger 6 has a coned or tapered end 8.

A breech 9 is attached to a sliding ram (not shown) working within the gun barrel 1. This ram is expelled from the barrel when the gun is fired.

The breech 9 has a flange part and a sleeve part forming a sleeve like member 10 and defining between them a groove 11 matching the coned end 8 of the plunger 6.

Figs. 2, 3 and 4 show the sequence of movements of the locking plunger and co-operating parts.

Referring to Fig. 2, this shows the normal position of the plunger and co-operating parts. It will be seen that the coned end of the plunger 6 is engaging the groove 11 in the sleeve like member 10 of the breech 9 and is extending through the sleeve portion 3 of the gun 1. In this position the seat is locked against movement.

Now referring to Fig. 3. When the gun is fired the breech 9 will be moved in the direction of the arrow A and the part 12 of the member 10 will move up to the part 13 of the top beam 5. During this movement the coned end 8 of the plunger 6 will be depressed by the wall 14 of the groove 11 free of this groove. It has been stated previously that the plunger is loaded by a spring 7. The plunger is now located in the hole 3a of the sleeve portion 3 of the combined gun-guide rail 1, 2, which parts are fixed to a part 20 of the aircraft structure and therefore immovable relatively to the seat structure and breech. In this position the seat is still held against ejection from the aircraft.

Fig. 4 illustrates the position of the various parts on the continuation of movement. Here it will be seen that the top beam and seat have commenced to move with the member 10, so that the coned or tapered end 8 of the plunger is caused to ride down the part 15 of the fixed cylindrical or sleeve portion 3 whereby the plunger has been further depressed and is now free of the sleeve portion 3. When this happens the final restraint or lock is removed and the seat is free to move out of the cockpit of the aircraft.

A pin 16 on the top beam 5 works in a slot 17 in the breech 9 so as to allow relative movement between the two parts.

It will be apparent that the invention can be variously modified and changed within the scope of the appended claim.

I claim:

In an ejection seat for launching from an aircraft, the combination comprising a seat having a top beam, an ejection gun having a fixed barrel and a breech attached to a sliding part working within said barrel, said top beam having a part extending over a part of said breech, a spring loaded locking plunger having a frusto-conical end and housed in said top beam and said frusto-conical end normally passing through a hole in said fixed barrel and engaging a matching groove in the breech, the thickness of the wall of said barrel at the periphery of said hole being less than the length of said frusto-conical end whereby the seat is normally locked against movement, but on the firing of the gun the breech commences to move out of the fixed barrel and the plunger is depressed by a wall of the groove aforesaid and is disengaged from the breech, and the upper part of the breech is brought into contact with a part of the top beam and thereafter the breech and seat move together so that the plunger is further depressed and disengaged from the barrel and the seat freed for ejection.

References Cited in the file of this patent

UNITED STATES PATENTS

| | | |
|---|---|---|
| 2,101,145 | Lee | Dec. 7, 1937 |
| 2,148,953 | Meissner | Feb. 28, 1939 |
| 2,467,763 | Martin | Apr. 19, 1949 |
| 2,516,902 | Musser | Aug. 1, 1950 |
| 2,527,020 | Martin | Oct. 24, 1950 |

FOREIGN PATENTS

| | | |
|---|---|---|
| 585,274 | Great Britain | Feb. 4, 1947 |